(12) United States Patent  (10) Patent No.: US 9,195,726 B2
Bharadwaj et al.  (45) Date of Patent: Nov. 24, 2015

(54) MECHANISM FOR FACILITATING DYNAMIC INTEGRATION OF DISPARATE DATABASE ARCHITECTURES FOR EFFICIENT MANAGEMENT OF RESOURCES IN AN ON-DEMAND SERVICES ENVIRONMENT

(71) Applicant: salesforce.com,inc, San Francisco, CA (US)

(72) Inventors: Narayan Bharadwaj, Fremont, CA (US); Prashant Kommireddi, South San Francisco, CA (US); Jed Crosby, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 278 days.

(21) Appl. No.: 13/841,153

(22) Filed: Mar. 15, 2013

(65) Prior Publication Data

US 2014/0279857 A1  Sep. 18, 2014

Related U.S. Application Data

(60) Provisional application No. 61/625,187, filed on Apr. 17, 2012.

(51) Int. Cl.
G06F 17/30 (2006.01)
(52) U.S. Cl.
CPC ................................ G06F 17/30557 (2013.01)
(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,088,693 A * | 7/2000 | Van Huben et al. .................. 1/1 |

(Continued)

OTHER PUBLICATIONS

Non-Final Office Action for U.S. Appl. No. 13/841,631 mailed Dec. 5, 2014, 20 pages.

(Continued)

Primary Examiner — Wilson Lee
(74) Attorney, Agent, or Firm — Blakely Sokoloff Taylor & Zafman LLP

(57) ABSTRACT

In accordance with embodiments, there are provided mechanisms and methods for facilitating dynamic integration of disparate database architectures for efficient management of resources in an on-demand services environment in a multi-tenant environment according to one embodiment. In one embodiment and by way of example, a method includes receiving, at a first database platform, a job request in a first programming package, transforming the job request from the first programming package to a second programming package, transmitting the job request in the second programming package to a second database platform for processing. The job request may be processed at the second database platform that is independent of the first database platform. The method may further include receiving an output relating to the processing of the job request.

20 Claims, 10 Drawing Sheets

(56) References Cited

U.S. PATENT DOCUMENTS

| | | | |
|---|---|---|---|
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,256,635 B1 | 7/2001 | Arrouye et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,204 B1 | 8/2004 | Hansen |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,685,167 B2 | 3/2010 | Mueller |
| 7,933,869 B2 | 4/2011 | Becker et al. |
| 8,161,047 B2 | 4/2012 | Akiyama et al. |
| 8,321,549 B2 | 11/2012 | Isobe et al. |
| 8,434,129 B2 | 4/2013 | Kannappan et al. |
| 8,732,200 B2 | 5/2014 | Tootill |
| 2001/0010055 A1* | 7/2001 | Hirabayashi ............. 709/201 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0090731 A1 | 4/2005 | Minogue et al. |
| 2005/0091098 A1 | 4/2005 | Brodersen et al. |
| 2005/0114097 A1* | 5/2005 | Duncan ............. 703/1 |
| 2005/0223374 A1 | 10/2005 | Wishart et al. |
| 2006/0230419 A1* | 10/2006 | Yoshida ............. 725/80 |
| 2006/0288123 A1* | 12/2006 | Vered ............. 709/246 |
| 2008/0086542 A1* | 4/2008 | Mukherjee et al. ........... 709/219 |
| 2008/0270987 A1 | 10/2008 | Weissman |
| 2009/0049102 A1 | 2/2009 | Weissman |
| 2009/0049288 A1 | 2/2009 | Weissman |
| 2009/0276405 A1 | 11/2009 | Weissman et al. |
| 2010/0042449 A1 | 2/2010 | Thomas |
| 2011/0276693 A1 | 11/2011 | Jensen-Horne et al. |
| 2011/0289047 A1 | 11/2011 | Ahuja |
| 2011/0289509 A1 | 11/2011 | Kothari et al. |
| 2011/0296381 A1 | 12/2011 | Mooney |
| 2011/0302148 A1* | 12/2011 | Kakade et al. ............. 707/710 |
| 2013/0179488 A1* | 7/2013 | Wang et al. .................. 709/203 |
| 2013/0239106 A1 | 9/2013 | Srinivasan et al. |
| 2013/0297668 A1 | 11/2013 | McGrath et al. |
| 2013/0332900 A1 | 12/2013 | Berg et al. |
| 2014/0082167 A1 | 3/2014 | Robinson et al. |
| 2014/0149591 A1 | 5/2014 | Bhattacharya et al. |

OTHER PUBLICATIONS

Kandasamy, Madhusudanan, et al., "Building Scalable Cloud-based Communication and Collaboration Services for SMB Enterprises", SRII 2011, San Jose, CA, Mar. 29-Apr. 2, 2011, pp. 59-66.

Martinez, P., et al., "Using the Script MIB for Policy-based Configuration Management", NOMS 2002, Florence, Italy, Apr. 15-19, 2002, pp. 187-202.

Rochwerger, Benny, et al., "The Reservoir model and architecture for open federated cloud computing", IBM J. Res. & Dev., vol. 53, No. 4, Paper 4, Jul. 2009, pp. 4:1-4:11.

Microsoft Computer Dictionary, 5th Edition, Microsoft Press, Redmond, WA, © 2002, pp. 410, 444 and 542.

* cited by examiner

User Input (Page Layout)

General Feature Information — 452

454 — Cloud: Sales
Feature Name: Accounts
Feature Granularity: Base
Feature Description: Account pageviews and API calls
Additional Comments:
Trust: Yes
Deployed Date: 6/1/2012 (6/7/2012)
UDO Name: Account (FORMULA FIELD) 402
456

■ = Required Information

Feature ID: F000017
Product Owner: Jed Crosby
TPM: Naryan Bharadwaj
Team: GUS
Owner: Naryan Bharadwaj
STATUS: Development (WORKFLOW VIEW) 458

FIG. 4B

Feature Metrics (Custom Object) ~404

| Id | Feature Name | PM | Instrumentation | Metric1 | Metric2 | Metric3 | Metric4 | Status |
|---|---|---|---|---|---|---|---|---|
| F0001 | Accounts | John | /001 | #requests | #UniqOrgs | #UniqUsers | AvgRT | Dev |
| F0002 | Visualforce | Nancy | /003 | #requests | #UniqOrgs | #UniqUsers | AvgRT | Review |
| F0003 | Visualforce | Eric | A | | #UniqOrgs | #UniqUsers | AvgRT | Deployed |
| F0004 | Visualforce | Roger | V | #requests | #UniqOrgs | #UniqUsers | AvgRT | Decom |

FIG. 4C

Trend Metrics (Custom Object) ↙ 410

| Id | Date | #Requests | #Unique Orgs | Avg ResponseTime |
|---|---|---|---|---|
| F0001 | 06/01/2012 | <big> | <big> | <little> |
| F0002 | 06/01/2012 | <big> | <big> | <little> |
| F0003 | 06/01/2012 | <big> | <big> | <little> |

FIG. 4D

MECHANISM FOR FACILITATING DYNAMIC INTEGRATION OF DISPARATE DATABASE ARCHITECTURES FOR EFFICIENT MANAGEMENT OF RESOURCES IN AN ON-DEMAND SERVICES ENVIRONMENT

CLAIM OF PRIORITY

This application claims the benefit of U.S. Provisional Patent Application No. 61/625,187, entitled "System and Method for Integrating Disparate Database Architectures in an On Demand Environment" by Narayan Bharadwaj, et al., filed Apr. 17, 2012, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating dynamic integration of disparate database architectures for efficient management of resources in an on-demand services environment.

BACKGROUND

With the rise of cloud-based technology, provider companies (e.g., Salesforce.com®) can afford to offer an increasing number of services to their customers. However, each such service can create a great number of transactions and relevant data when offered and/or in use (e.g., a user accessing Chatter®, etc.). To keep up with the changing technologies while improving their services to their customers, these provider companies often have to hire an entire team of software/database administrators and developers to perform the tedious task of going through any number of daily logs of service-related transactions and the relevant data. In addition to being tedious, the idea of having humans perform such tasks is naturally inefficient, time-consuming, and error-prone.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

BRIEF DESCRIPTION OF THE DRAWINGS

In the following drawings like reference numbers are used to refer to like elements. Although the following figures depict various examples, one or more implementations are not limited to the examples depicted in the figures.

FIG. 4B is a screenshot of a user input page or layout according to one embodiment;

FIG. 4C is a screenshot of feature metrics according to one embodiment;

FIG. 4D is a screenshot of trend metrics according to one embodiment;

SUMMARY

Figure 1:
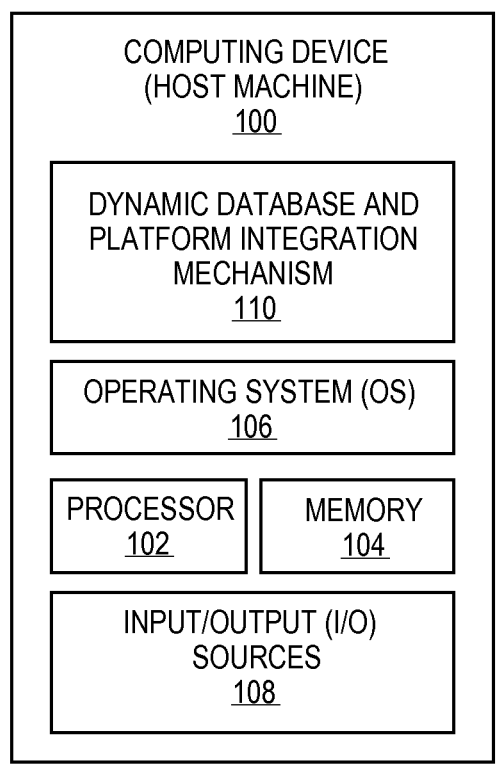
FIG. 1 illustrates a computing device employing dynamic database and platform integration mechanism according to one embodiment.

In accordance with embodiments, there are provided mechanisms and methods for facilitating dynamic integration of disparate database architectures for efficient management of resources in an on-demand services environment in a multi-tenant environment according to one embodiment. In one embodiment and by way of example, a method includes receiving, at a first database platform, a job request in a first programming package, transforming the job request from the first programming package to a second programming package, transmitting the job request in the second programming package to a second database platform for processing. The job request may be processed at the second database platform that is independent of the first database platform. The method may further include receiving an output relating to the processing of the job request.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

Methods and systems are provided for facilitating dynamic integration of disparate database architectures for efficient management of resources in an on-demand services environment in an on-demand services environment. In one embodiment and by way of example, a method includes receiving, at a first database platform, a job request in a first programming package, transforming the job request from the first programming package to a second programming package, transmitting the job request in the second programming package to a second database platform for processing. The job request may be processed at the second database platform that is independent of the first database platform. The method may further include receiving an output relating to the processing of the job request.

Embodiments provide for dynamic integration of disparate database architectures for efficient management of resources in an on-demand environment. For example and in one embodiment, a first on-demand database/platform (e.g., Force.com® by Salesforce.com®, etc.) that manages and receives definitions of jobs, features, etc., may be dynamically integrated with a second database/platform a second database/platform (e.g., Apache™ Hadoop®, etc.), known for processing large data sets, where those definitions may be submitted for processing. In other words, the first on-demand database may serve as an intermediary layer or tier between, for example, the user-level equipment (e.g., client computing device) and the second database such the first on-demand database may outsource large computing/processing tasks to the second database, saving both the computing and human resources. Further, for example and in one embodiment, a job output, resulting from data processing, may be received from the second database and stored (e.g., as a custom object) at the first database so that it may be visualized or displayed in an optional visualization layer (e.g., as reports, dashboards, etc.) at the client computing device for the user to use the information to prepare any number and type of graphs, charts, trends, etc.

The term "user" may refer to a system user, such as a system administrator, a software developer, etc., or an end-user, such as a representative of a customer (e.g., an organization, a company, an institution, etc.). Further, it is contemplated that any reference to databases platforms (e.g., Hadoop, HBase™, Oozie™, OpenTSDB™, etc.), programming languages (e.g., Apache Pig™, Java®, The R Project™, etc.), other software, servers, and platforms (e.g., Force.com, Tableau®, Gephi®, etc.) are merely used as examples throughout the document for brevity, clarity, and ease of understanding and that embodiments are not limited to such references.

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

FIG. 1 illustrates a computing device 100 employing dynamic database and platform integration mechanism 110 according to one embodiment. In one embodiment, computing device 100 serves as a host machine employing dynamic database and platform integration mechanism ("integration mechanism") 110 for facilitating dynamic integration of disparate database and their corresponding platforms for efficient processing of data and management of resources in a multi-tiered, multi-tenant, on-demand environment. As aforementioned, the term "user" may refer to a system user, such as a program manager, product manager, an executive (chief technology officer (CTO), director of finance, etc.), a system administrator, a software developer, etc., or an end-user, such as a representative of a customer (e.g., an organization, a business, a company, a corporation, a non-profit entity, an institution, an agency, etc.). It is to be noted that terms like "user", "customer", "organization", "tenant", "business", "company", etc., may be used interchangeably throughout this document.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "input", "request" and "message" may be used interchangeably throughout this document.

Figure 2:
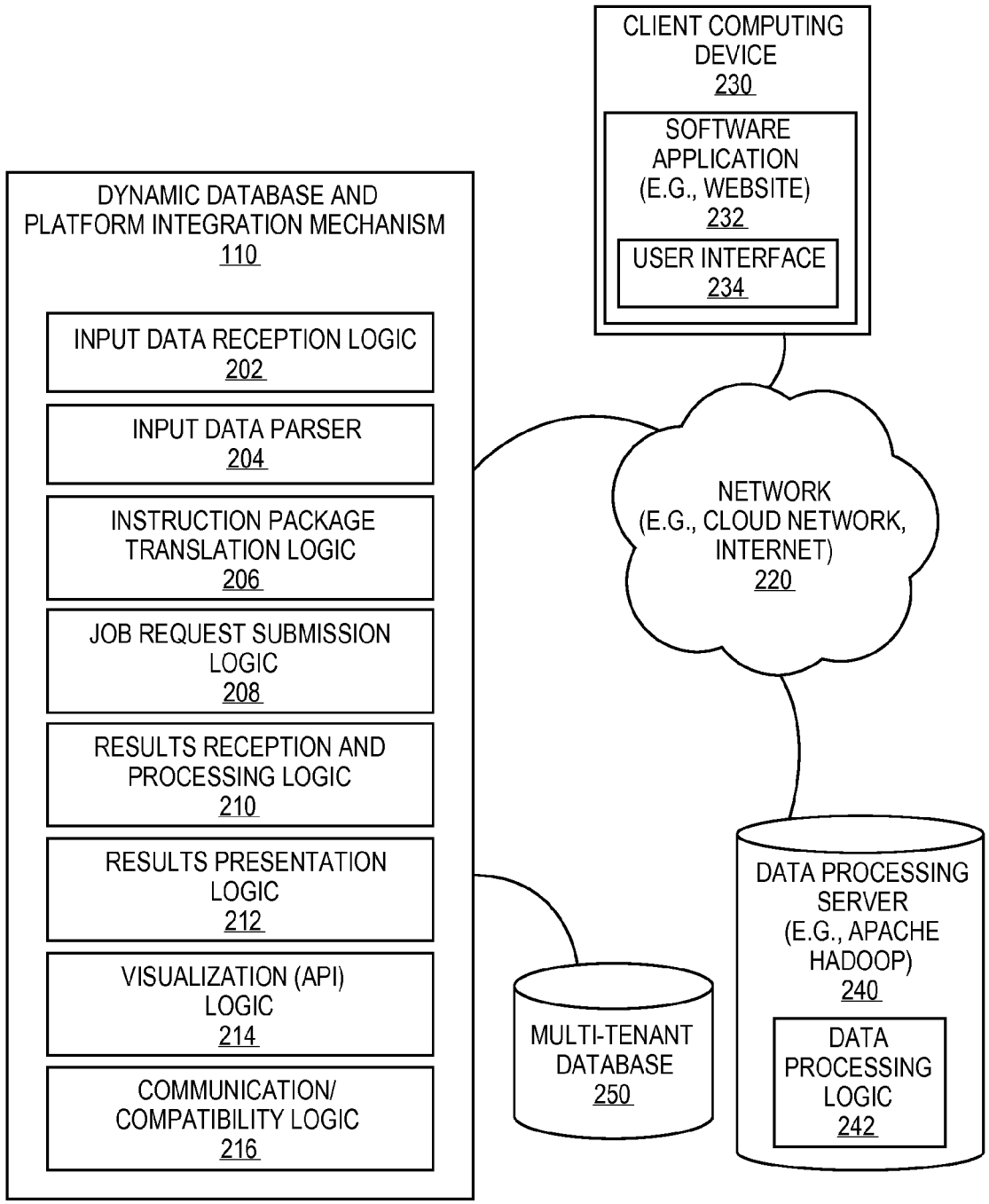
FIG. 2 illustrates dynamic database and platform integration mechanism according to one embodiment.

FIG. 2 illustrates dynamic database and platform integration mechanism 110 according to one embodiment. In one embodiment, integration mechanism 110 includes a number of components, such as input data reception logic 202, input data parser 204, instruction package translation logic 206, job request submission logic 208, results reception and processing logic 210, results presentation logic 212, visualization (application programming interface (API)) logic 214, and communication/compatibility logic 216. Throughout this document, "logic" may be interchangeably referred to as "component" or "module" and may include, by way of example, software, hardware, and/or any combination of software and hardware, such as firmware.

In one embodiment, integration mechanism 110 may be employed at a server computing system, such as host machine 100 of FIG. 1, representing a first database platform/architecture or environment (e.g., Force.com) and employing or be in communication with multi-tenant database 250 and further in communication with one or more client computing devices, such as client computing device 230, over a network, such as network 220 (e.g., a cloud-based network, the Internet, etc.). Client computing device 230 may be accessible to users/organizations and be the same as or similar to computing device 100 of FIG. 1 and include a mobile computing device (e.g., smartphones, tablet computers, laptops, etc.) or larger computers (e.g., desktop computers, server computers, etc.).

In one embodiment, input data reception logic 202 to receive input data from one or more sources, such as an input layout provided through a user input page that can be used by a user to input a request regarding product metrics (e.g., one or more products offered by a provider, such as Salesforce.com), such as products, features, platforms, websites, programing languages, user interfaces, etc., such as accounts, contacts, APIs/user interfaces, custom objects, Sales Cloud®, Service Cloud®, Marketing Cloud®, Work.com®, Chatter®, Force.com, Visualforce®, Apex®, Data.com®, Database.com®, Heroku®, etc. Similarly, input data and relevant metadata may be obtained from other sources, such as internal application log files (that track and keep logs of each transaction), external usage files from external sources (e.g., users/customers, such as organizations, etc.), etc., and, for example, may be stored as custom objects at database 250. Input data parser 204 may parse the input data (e.g., input data relating to Chatter, etc.) and provides the parsed data package (e.g., feature metrics (e.g., custom object)) to instruction package generation logic 206 for further processing.

In one embodiment, instruction package translation logic 206 may include logic that provides modules for translation (e.g., generation, conversion, etc.) of packages having parsed input data, such as feature metrics, from one programming language (e.g., a programming language, such as Java, etc.) to another programming language, such as a programming language that runs on disparate architecture, such as Pig Latin®, using a high-level platform, such as Apache Pig®, that is compatible with or more efficient with regard to data processing server 240. In conventional systems, with increasing number of services, a great deal of data relating to transactions is required to maintained and regularly deciphered so that better and increasing number of services may be provided. Such tasks are difficult to accomplish when dealing with disparate platforms or databases, such as database 250 and data processing server 240, that are independent of each other and may even be incompatible with each other, and thus, conventional techniques, often require a number of software developers/administrators to collect data (e.g., transaction entries including user transactions, service transactions, equipment performance transactions, etc.) from log files and manually decipher it, which is time-consuming and leads to mistakes. In one embodiment, disparate platforms/databases 240, 250 be integrated despite being independent of, incompatible to, and remotely located from each other. This is described throughout the document and further illustrated with reference to FIG. 4A.

For example, if data processing server 240 includes Apache Hadoop, the instruction package having parsed input data and any relevant data may be generated in Pig or converted from, for example, Java to Pig Latin, or the like. For example, with regard to Pig, instruction package translation logic 206 may automatically facilitate a Pig script which may then be fed into a Pig execution engine and then into a map reduce, etc., before the job package is prepared in Pig to be processed at data processing server 240. In other words, this automatic translation technique allows for the instruction package to be automatically and dynamically converted into the most compatible or efficient programming language without having the need to employ software programmers/developers for manual programming.

Once the translation is completed, the instruction package is prepared as a job package with is then forwarded on to data processing server 240 using job request submission logic 208. Upon receiving the job package, data processing logic 242 of data processing server 240 triggers processing of the job package at data processing server 240. This data processing of the job package may generate a variety of results including information about various products of the product matrix provided as trend metrics. For example, the data processing may take into consideration tasks like tracking feature usage/adoption (e.g., accounts, contacts, Visualforce, Apex, etc.), standard metrics across any and all features (e.g., #Requests, #UniqueOrgs, #UniqueUsers, AveResponseTime, etc.), features and metrics across any and all channels (e.g., APIs, UIs, mobile, etc.), etc., while considering the primary audience of the results, such as executives, program managers, product managers, software developers, system administrators, end-user, etc. In other words, this processing of data provides information (such as how often a feature is accessed by users, which problems are associated with what feature, etc.) that can then be used to improve the provider's products. Similarly, embodiments are not limited to any particular format of product metrics in terms of presentation and visualization of the processed data, such as visualization logic 214 may convert the trend metrics into various visual formats, as requested by the user (e.g., product manager, etc.). Some of these visual formats may include, but are not limited to, spreadsheets, text formats, graphs, pie-charts, line-charts, bar-charts, or the like, as preferred by the user. Further, the results provided by these formats may include one or more of user behavior analysis, capacity planning, monitoring intelligence, performance analysis, security, ad-hoc log searches, collaborative filtering, search relevancy, etc.

In one embodiment, results reception and processing logic 210 receives the raw result or output from data processing server 240 and processes the results in the matter so they can be converted or translated back into the base programming language (e.g., convert back from Pig into Java or Apex, etc.). Once the results have been processed, they are then provided to results presentation logic 212 to prepare the results for presentation so that they may be organized, properly tagged, put in columns and rows, etc., for easier manipulation and conversion into graphs, charts, etc., by visualization (API) logic 214. For example, the results may be presented as trend metrics (e.g., custom objects) that are provided as a summary of results, such as daily summaries. Visualization logic 214 may convert the trend metrics into various visual formats, as requested by the user (e.g., product manager, etc.), so that maximum benefit of the results may be obtained. Some of these visual formats may include, but are not limited to, spreadsheets, text formats, graphs, pie-charts, line-charts, bar-charts, or the like, as preferred by the user. Visualization (API) logic 214 may transmit, via communication/compatibility logic 216, the result in one or more presentation formats to client computing device 230 where a user (e.g., product manager) may view the results via a user interface, such as user interface 234 provided by software application (e.g., Chatter) 232 over network 220.

In one embodiment and as illustrated, integration mechanism 110 facilitates both integration and outsourcing purposes. For example, as illustrated here, using integration mechanism 110 two separate and different database platforms, such as a locally-located multitenant database 250 and a remotely-located data processing server 240, may be integrated to work together to perform certain tasks, jobs, etc. However, in doing so, integration mechanism 110 is outsourcing these tasks or jobs that are typically performed locally, such as by database 250 and/or manually by one or more database experts, such as developers, administrators, etc. This novel technique for integrating and outsourcing, significantly lowers the burden on database 250 while removing the need for any manual review and manipulation of data and with that any human errors, labor, and the like.

Communication/configuration logic 216 may facilitate the ability to dynamically communicate and stay configured with any number and type of data processing servers, database platforms and architectures, programming languages and their corresponding platforms, etc. Communication/configuration logic 216 further facilitates the ability to dynamically communicate and stay configured with various computing devices (e.g., mobile computing devices (such as various types of smartphones, tablet computers, laptop, etc.), networks (e.g., Internet, intranet, cloud-computing network, etc.), websites (such as social networking websites (e.g., Facebook®, LinkedIn®, Google+®, etc.)), etc., while ensuring compatibility with changing technologies, parameters, protocols, standards, etc.

It is contemplated that any number and type of components may be added to and/or removed from integration mechanism 110 to facilitate various embodiments including adding, removing, and/or enhancing certain features. For brevity, clarity, and ease of understanding of integration mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

Figure 3:
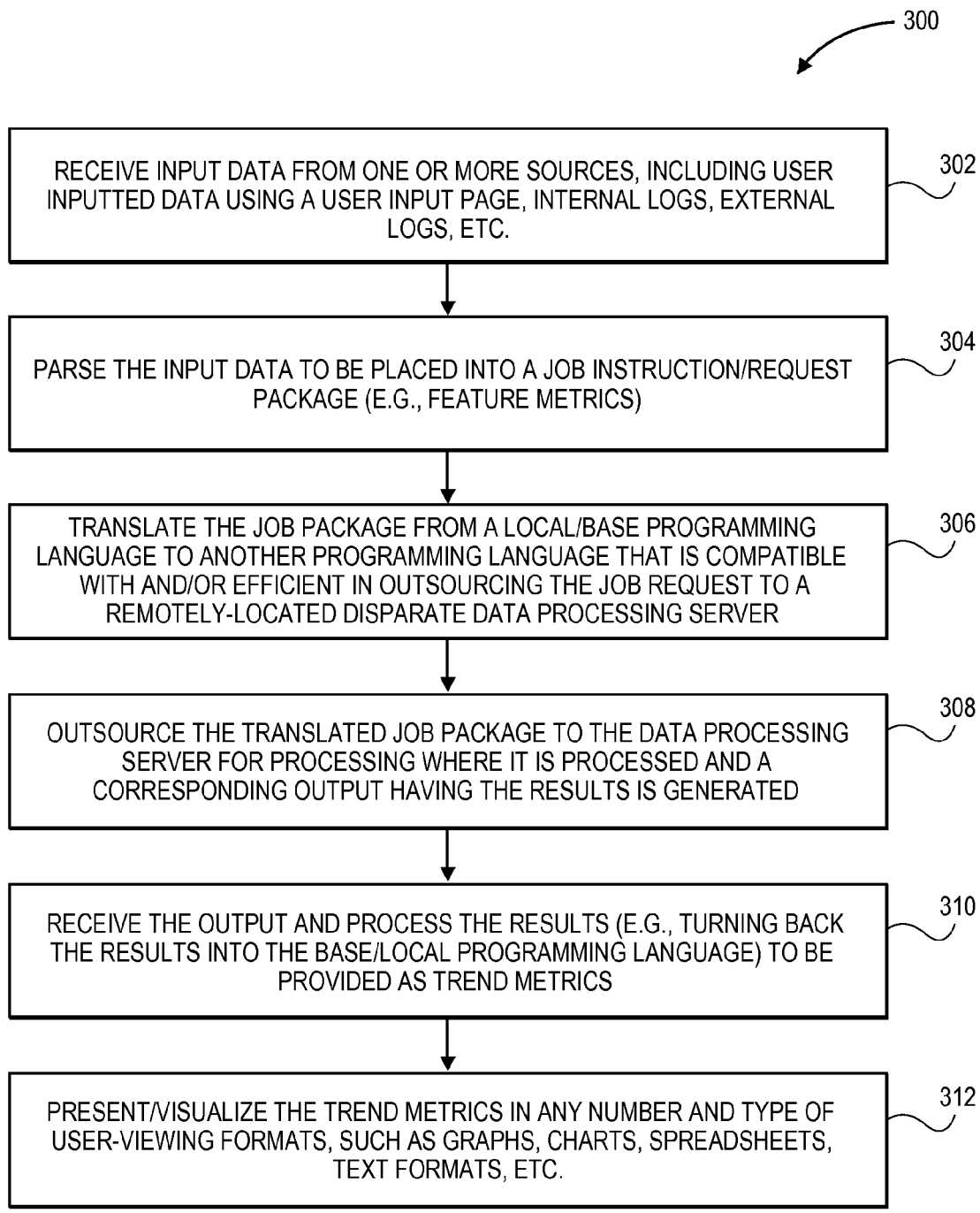
FIG. 3 illustrates a method for facilitating dynamic integration of disparate database architectures for efficient management of resources in an on-demand services environment in a multi-tenant environment according to one embodiment.

FIG. 3 illustrates a method 300 for facilitating dynamic integration of disparate database architectures for efficient management of resources in an on-demand services environment in a multi-tenant environment according to one embodiment. Method 300 may be performed by processing logic that may comprise hardware (e.g., circuitry, dedicated logic, programmable logic, etc.), software (such as instructions run on a processing device), or a combination thereof. In one embodiment, method 300 may be performed by dynamic database and platform integration mechanism 110 of FIG. 1.

Method 300 begins at block 302 with receiving input data from one or more sources, including user inputted data using a user input page, internal logs, external logs, etc. The user may input data at a client computing device via a user interface. At block 304, the input data is parsed and placed into a job instruction package (e.g., feature metrics). At block 306, the package having the parsed data is translated from a local or base programming language to the one that is compatible with and/or more efficient in outsourcing the job to a disparate data processing server that may be remotely-located. At block 308, the job package is outsourced to the data processing server for processing where it is processed and the corresponding results are generated. At block 310, the results are processed (e.g., turning back the results into the base/local programming language) to be provided as trend metrics. At block 312, the processed results or trend metrics are then presented in any number and type of formats (e.g., graphs, charts, spreadsheets, text, etc.) that can then be communicated to a user (e.g., product manager, project manager, administrator, etc.) where the formats can be visualized and modified as desired by the user. The results may be presented or displayed via a display device in communication with the client computing device.

Figure 4A:
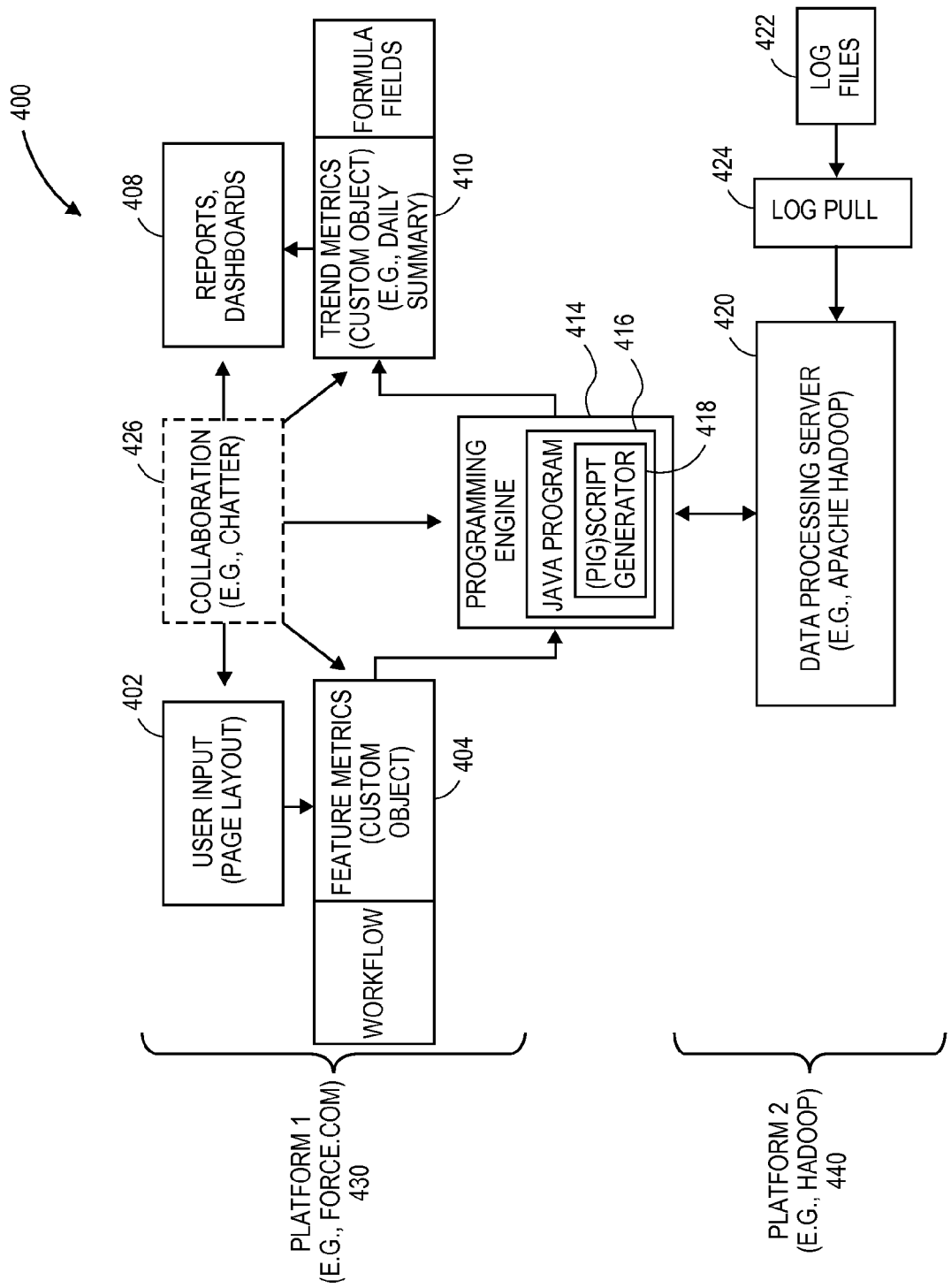
FIG. 4A illustrates a transaction sequence for facilitating dynamic integration of disparate database architectures for efficient management of resources in an on-demand services environment in a multi-tenant environment according to one embodiment.

FIG. 4A illustrates a transaction sequence 400 for facilitating dynamic integration of disparate database architectures for efficient management of resources in an on-demand services environment in a multi-tenant environment according to one embodiment. Transaction sequence 400 may be performed by processing logic that may comprise hardware (e.g., circuitry, dedicated logic, programmable logic, etc.), software (such as instructions run on a processing device), or a combination thereof. In one embodiment, method 400 may be performed by dynamic database and platform integration mechanism 110 of FIG. 1. For brevity, clarity, and ease of understanding and not to obscure integration mechanism 110, many of the features, components, and/or processed mentioned above are not repeated here.

In one embodiment, transaction sequence 400 begins at database or platform 1 430 (e.g., Force.com) with user input 402 using a user input page layout as shown in FIG. 4B. The information is the received and reflected in feature metrics 404 (e.g., custom object) as shown in FIG. 4C. The information is then fed into programming engine 414 employed at a computing device, where programming engine 414 may have a running program, such as custom Java program 416. In one embodiment, Java program 416 may provide script generator 418 for generating a program script for a program language (e.g., Pig) that is compatible with data processing sever 420. In the illustrated embodiment, database/platform 1 430 is integrated with database or platform 2 440 that includes data processing server 420 (e.g., Apache Hadoop). In one embodiment, the two independent platforms 430, 440 are integrated, using integration mechanism 110 of FIG. 1, such as by providing programming engine 414 to facilitate integrated communication between the two platforms 430, 440. Since, in our example, data processing server 420 includes an Apache Hadoop, Java program 416 may offer a Pig script using script generator 418. The information obtained through user input 402 and any other information log pulled 424 from log files 422 is processed at data processing server 420 at platform 2 440 that is integrated with platform 1 430.

Once the processing is completed, the information is offered as trend metrics 410 (e.g., custom object) representing a summary of the results (e.g., daily summary) as shown in FIG. 4D. The results are the offered as reports or dashboards 408 in any number and type of formats to the user (e.g., product manager, etc.). In one embodiment, collaboration between various transaction stages 404, 404, 408, 410, 414 may be provided using, for example, Chatter by Salesforce.com.

FIG. 4B is a screenshot of user input page or layout 402 according to one embodiment. The illustrated page layout provides space for a Salesforce.com cloud account name 452, such as Chatter, to be entered. Similarly, any number and type of information may be entered or provided, such as feature name 454, feature ID 456, status 458, and the like, where, for example, feature ID 456 may include a formula field, and workflow rule may be provided to protect status 458, etc.

Referring now to FIG. 4C, it is a screenshot of feature metrics 404 that is essentially a table including rows and columns of fields that are look at and reviewed by data processing server 420 to determine whether they need processing. Similarly, for example, instrumentation 462 and status 464 columns may be used by Java program 416 for various determinations and processes. Column PM 466, for example, may provide the name the name of the user (e.g., product manager) who would be viewing the information and processing results, such as a product manager. FIG. 4D is a screenshot of trend metrics 410 provide a recordation of data in a summary format, such as having columns and rows serving as an output or recorded metrics of each feature, such as dates, requests, average response time, etc.

Figure 5:
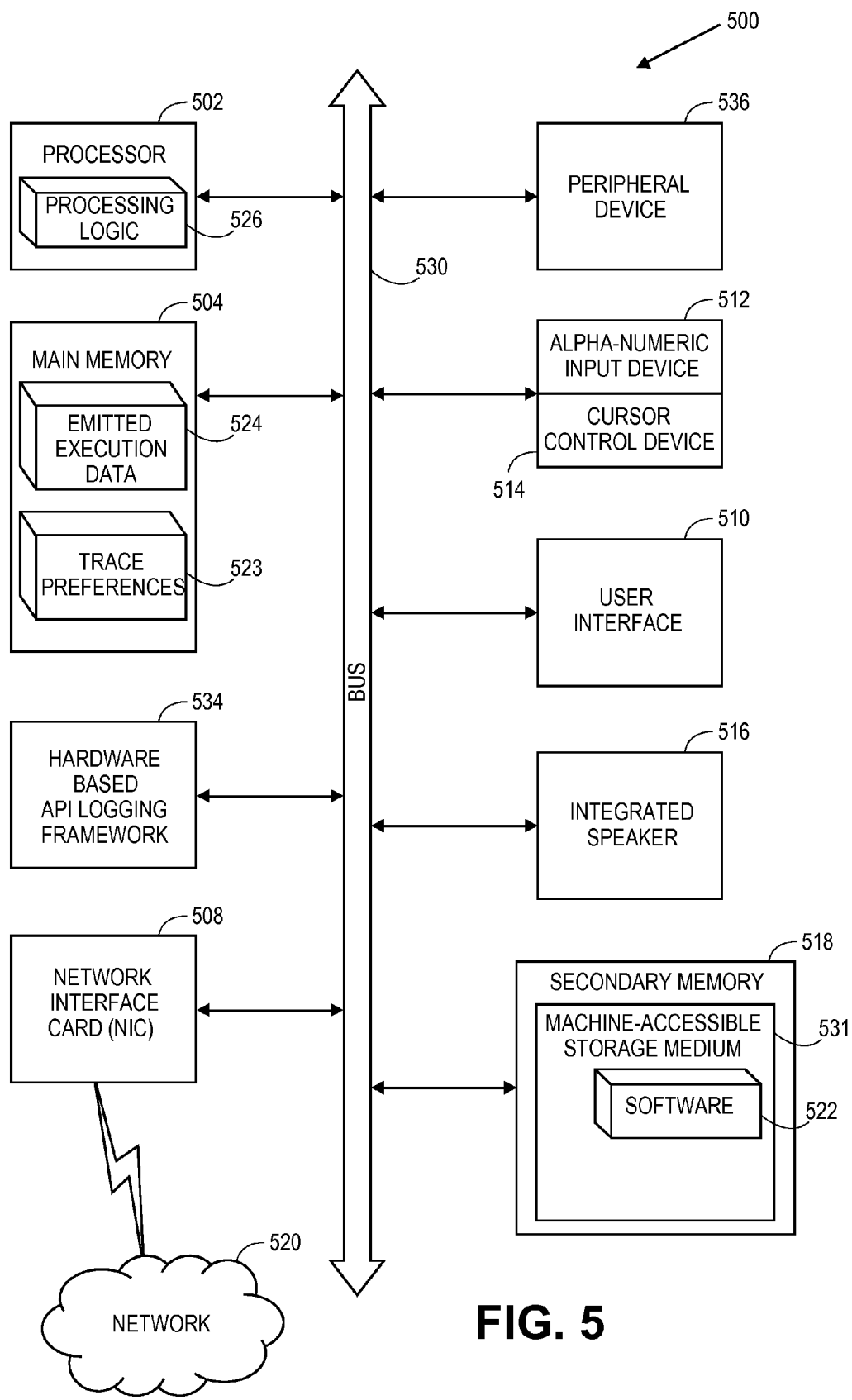
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 230 of FIG. 1 and FIG. 2, respectively. In alternative embodiments, the machine may be connected (e.g., networked) to other machines in a network (such as host machine 100 of FIG. 1 connected with client machine 230 over network 220 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
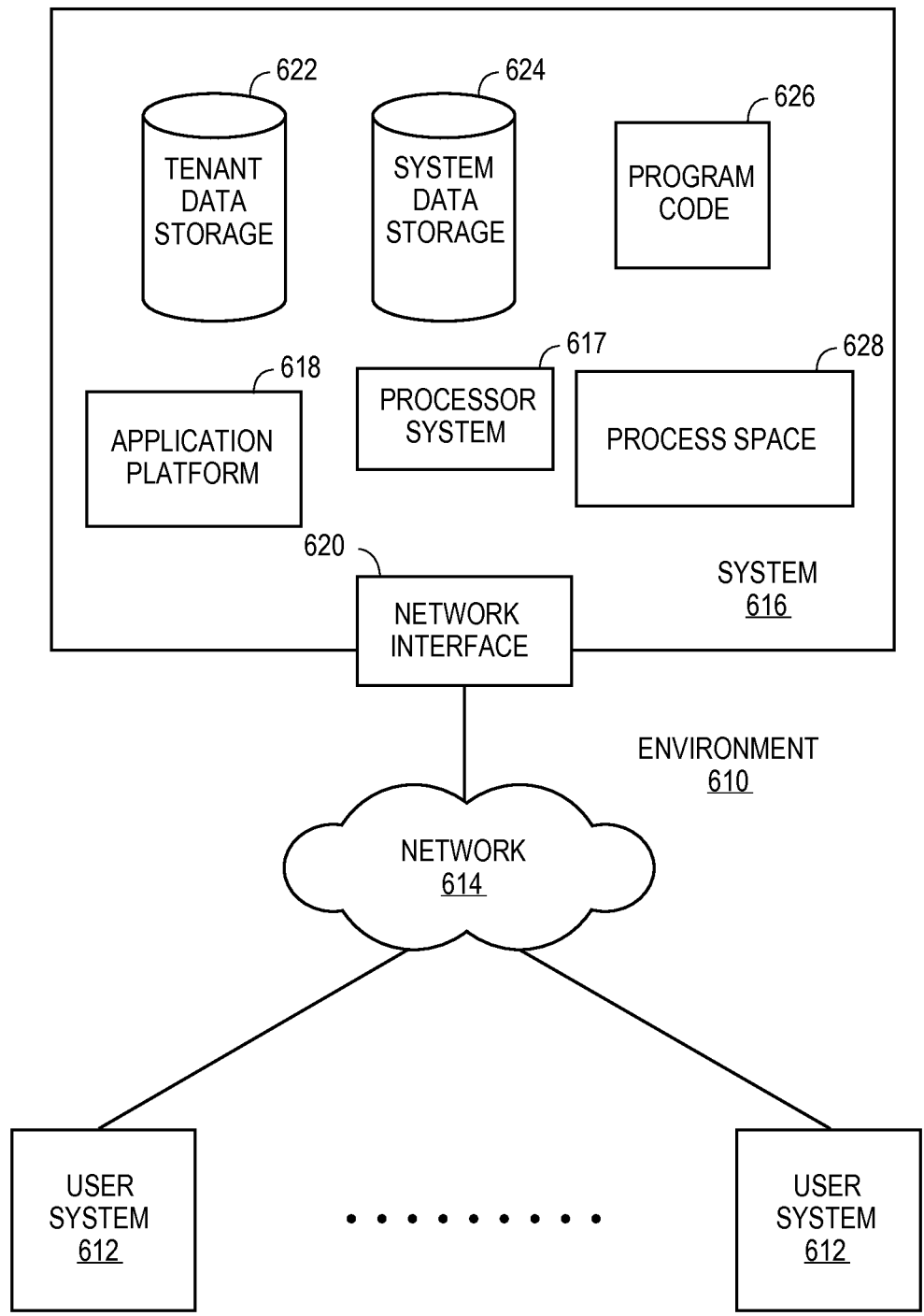
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android®, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
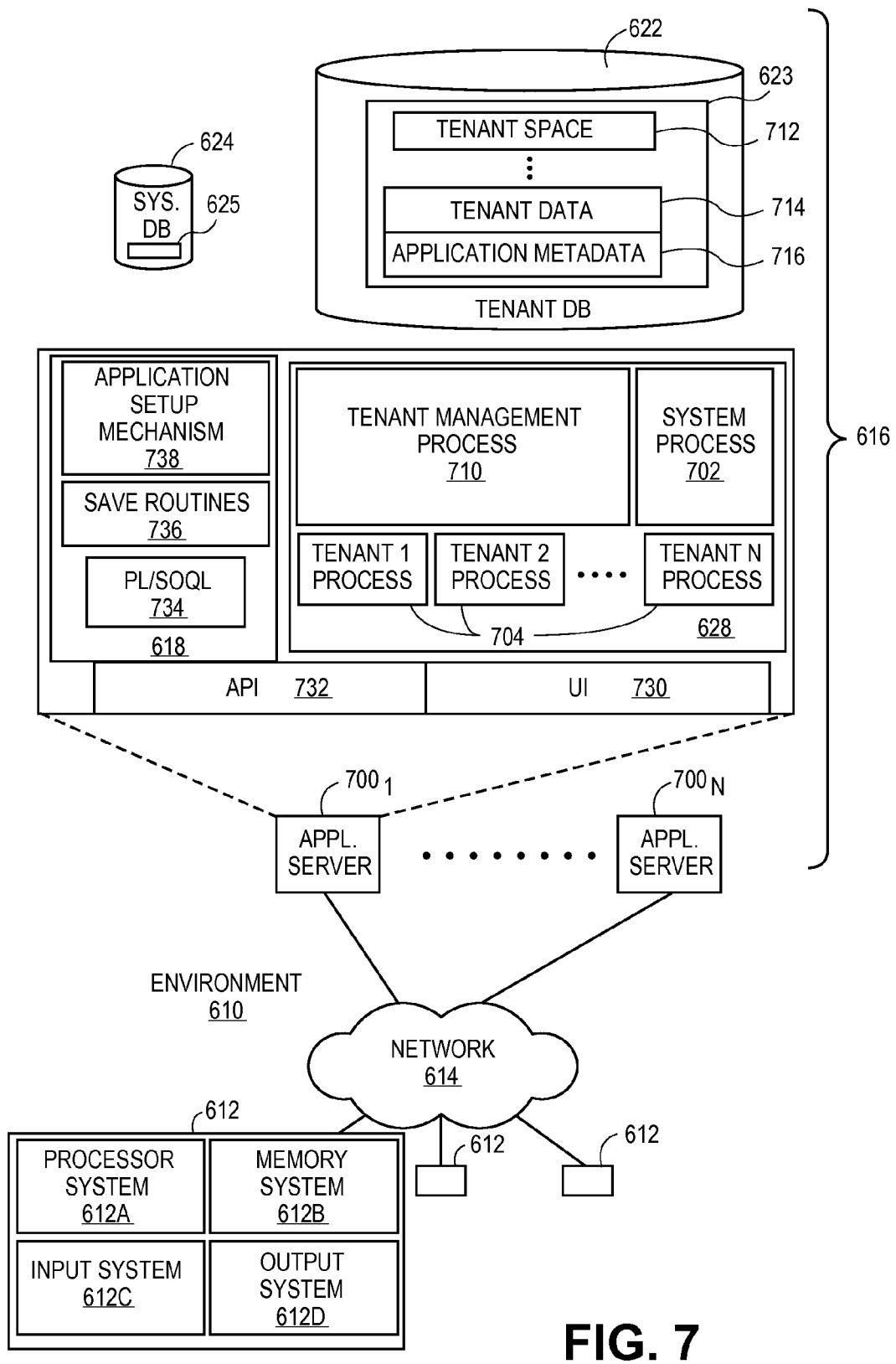
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers $700_1$-$700_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method comprising:
   receiving, at a first database platform of the database system, a job request from a user having access to a computing device, wherein the job request is associated with a first programming package based on at least one of a first programming language and a first set of programming protocols;
   seeking, by the database system, a third-party entity, at a second database platform, to process the job request;
   translating, by the database system, the first programming package into a second programming package, wherein the second programming package is compatible with the third-party entity, and wherein the second programming package is based on at least one of a second programming language and a second set of programming protocols;
   transmitting, by the database system, the job request associated with the second programming package to the third-party entity; and
   receiving, by the database system and from the third-party entity, an output relating to the processing of the job request.

2. The method of claim 1, further comprising displaying the output of the processed job request via a display device of the computing device coupled to the first database platform, wherein displaying includes visualizing the output in a format including one or more of graphs, charts, text formats, and spreadsheets.

3. The method of claim 1, wherein the first programming language and the first set of programming protocols are compatible with the first database platform.

4. The method of claim 1, wherein the second programming language and the second set of programming protocols are compatible with the second database platform.

5. The method of claim 1, wherein the second database platform comprises a data processing server including an Apache™ Hadoop®.

6. The method of claim 1, wherein the first database platform comprises a local multi-tenant database.

7. The method of claim 6, wherein the first database platform and the second database platforms include disparate platforms that are remotely located.

8. A system comprising:
   a computing device having a memory to store instructions, and a processing device to execute the instructions, the computing device further having a mechanism to:
   receive, at a first database platform of the database system, a job request from a user having access to a computing device, wherein the job request is associated with a first programming package based on at least one of a first programming language and a first set of programming protocols;
   seek, by the database system, a third-party entity, at a second database platform, to process the job request;
   translate, by the database system, the first programming package into a second programming package, wherein the second programming package is compatible with the third-party entity, and wherein the second programming package is based on at least one of a second programming language and a second set of programming protocols;
   transmit, by the database system, the job request associated with the second programming package to the third-party entity; and
   receive, by the database system and from the third-party entity, an output relating to the processing of the job request.

9. The system of claim 8, wherein the mechanism is further to display the output of the processed job request via a display device of the computing device coupled to the first database platform, wherein displaying includes visualizing the output in a format including one or more of graphs, charts, text formats, and spreadsheets.

10. The system of claim 8, wherein the first programming language and the first set of programming protocols are compatible with the first database platform.

11. The system of claim 8, wherein the second programming language and the second set of programming protocols are compatible with the second database platform.

12. The system of claim 8, wherein the second database platform comprises a data processing server including an Apache™ Hadoop®.

13. The system of claim 8, wherein the first database platform comprises a local multi-tenant database.

14. The system of claim 13, wherein the first database platform and the second database platforms include disparate platforms that are remotely located.

15. A non-transitory computer-readable medium having stored thereon instructions which, when executed by a processor, cause the processor to:
   receive, at a first database platform of the database system, a job request from a user having access to a computing device, wherein the job request is associated with a first programming package based on at least one of a first programming language and a first set of programming protocols;
   seek, by the database system, a third-party entity, at a second database platform, to process the job request;
   translate, by the database system, from the first programming package into a second programming package, wherein the second programming package is compatible with the third-party entity, and wherein the second programming package is based on at least one of a second programming language and a second set of programming protocols;
   transmit, by the database system, the job request associated with the second programming package to the third-party entity; and
   receive, by the database system and from the third-party entity, an output relating to the processing of the job request.

16. The non-transitory computer-readable medium of claim 15, wherein the mechanism is further to display the output of the processed job request via a display device of the computing device coupled to the first database platform, wherein displaying includes visualizing the output in a format including one or more of graphs, charts, text formats, and spreadsheets.

17. The non-transitory computer-readable medium of claim 15, wherein the first programming language and the first set of programming protocols are compatible with the first database platform.

18. The non-transitory computer-readable medium of claim 15, wherein second programming language and the second set of programming protocols are compatible with the second database platform, wherein the second database platform comprises a data processing server including an Apache™ Hadoop®.

19. The non-transitory computer-readable medium of claim 15, wherein the first database platform comprises a local multi-tenant database.

20. The non-transitory computer-readable medium of claim 19, wherein the first database platform and the second database platforms include disparate platforms that are remotely located.

* * * * *